Jan. 15, 1957 L. H. SKROMME ET AL 2,777,275
RAKE BAR BEARING ASSEMBLY
Original Filed April 5, 1952 2 Sheets-Sheet 1

INVENTOR.
Lawrence H Skromme
BY Melvin J Happe
Richard E. Babcock Jr.
ATTORNEY

Jan. 15, 1957  L. H. SKROMME ET AL  2,777,275
RAKE BAR BEARING ASSEMBLY
Original Filed April 5, 1952  2 Sheets-Sheet 2

INVENTORS
Lawrence H. Skromme
and Melvin J. Happe
Richard E. Babcock Jr.
ATTORNEY United States Patent Office 2,777,275
Patented Jan. 15, 1957

2,777,275

RAKE BAR BEARING ASSEMBLY

Lawrence H. Skromme, Manheim Township, Lancaster County, and Melvin J. Happe, New Holland, Pa., assignors to New Holland Machine Division of the Sperry Rand Corporation, New Holland, Pa., a corporation of Delaware Original application April 5, 1952, Serial No. 280,752, now Patent No. 2,750,729, dated June 19, 1956. Divided and this application August 3, 1954, Serial No. 447,552

5 Claims. (Cl. 56—377)

This invention relates to a side delivery hay rake of the well known roller bar reel type as exemplified in the W. E. Martin U. S. Patent 818,899 of April 24, 1906, and more particularly to the means for mounting the bearings on the rake bars of a rake of this type.

This application is a division of our co-pending application Serial No. 280,752 filed April 5, 1952, now Patent No. 2,750,729, issued June 19, 1956.

While side delivery rakes of the roller bar reel type have been satisfactory in many respects, the bearing means for coupling the roller bars to their supporting reel spiders have been subjected to rapid wear, due in part to tendency of foreign material to enter and deteriorate the bearings and also due in part to the twisting forces imposed on the bearing during operation of the rake and tending to cause brinelling.

The twisting forces are produced partly by the weight of the respective bars which are normally supported at a location axially spaced from the bearing centers and to a larger extend by the operative engagement (hereinafter referred to simply as ground engagement) of the rake tines with the hay and/or the ground. The combined moments of force transmitted to each bar through its several tines create a substantial torque on the rake bar tending to twist it about its supporting bearings. The magnitude of the twisting movement exerted on the bearings will obviously increase with the distance between the free ends of the rake bars and a line extending between the centers of the respective bearings.

With the above considerations in mind, it is an important object of the invention to reduce to a minimum the twisting forces to which the bearings are subjected. We have found that this may be accomplished by supporting each rake bar in such a position that its major axis intersects the axis of its supporting bearings in the central radial planes of the bearings. We thus eliminate that portion of the twisting force which results from the weight of the bar and reduce to a minimum the twisting movement caused by ground engagement. Moreover, due to maintaining the twisting forces on the bearings at a minimum, our invention renders practical the use of but a single bearing at each end of the rake bar in lieu of the two axially spaced bearings such as formerly were required to successfully resist the twisting forces imposed on the rake bar.

The foregoing, as well as other incidental objects and advantages are attained by the embodiment of the invention illustrated in the accompanying drawings in which.

Figure 1:
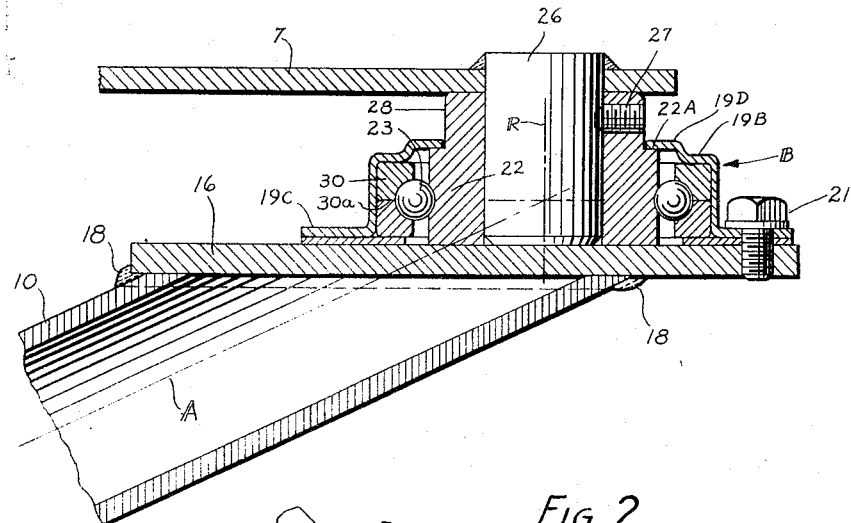
Figure 1 represents a fragmentary cross-section through one of the spiders of a raking reel and one of the rake bars pivotally connected thereto, the view being taken in the common axial plane of the rake bar and its pivotal connection to the spider.
Figure 3:
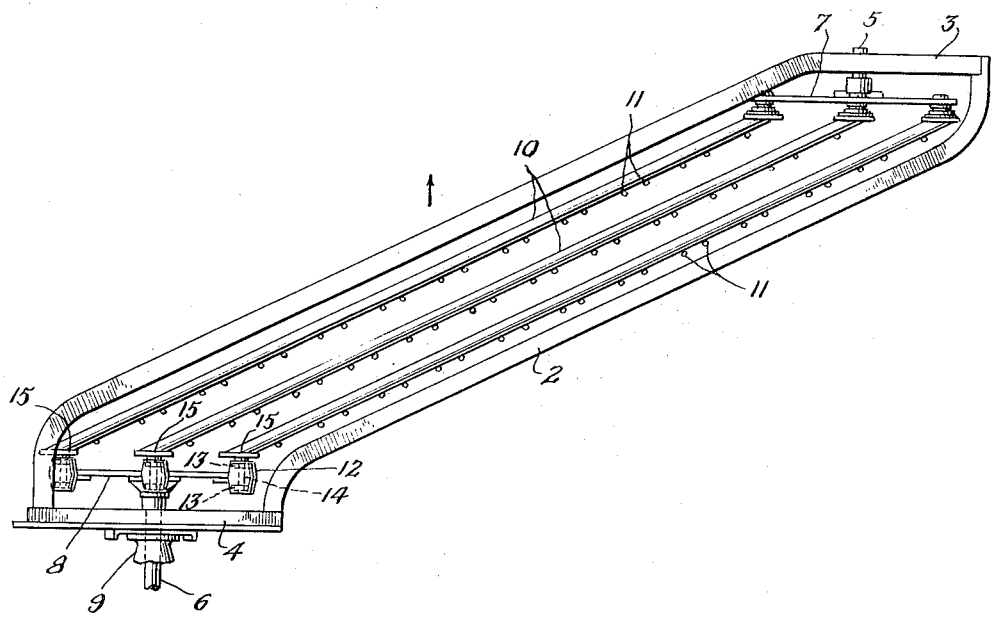
Fig. 3 is a plan view of a roller-bar type side delivery rake assembly embodying our invention.

Referring now in detail to the accompanying drawings, there is shown in Fig. 3 a rigid rake basket 2 of the type which is commonly supported for ground traversing movement on a wheeled rake frame with the major dimension of the basket 2 extending diagonally to the direction of ground traversing movement, indicated by the arrow in Fig. 1.

Rotatably journaled in the forward and rear ends 3 and 4, respectively, of the basket are parallel horizontal shafts 5 and 6 which support the end plates or spiders 7 and 8 at the opposite ends of the raking reel. The rearmost shaft 6 is received in gear box 9 (shown fragmentarily) through which it is driven by any suitable or conventional means.

Extending diagonally between the respective spiders 7 and 8 are the usual roller bars 10, each supporting a series of downwardly directed rake tines 11, the arrangement being such that rotation of the reel during ground traversing movement of the rake causes the rake bars 10 to successively engage the hay by means of their tines 11 and form the hay into a windrow extending from the rearmost or driven end of the reel.

Figure 2:
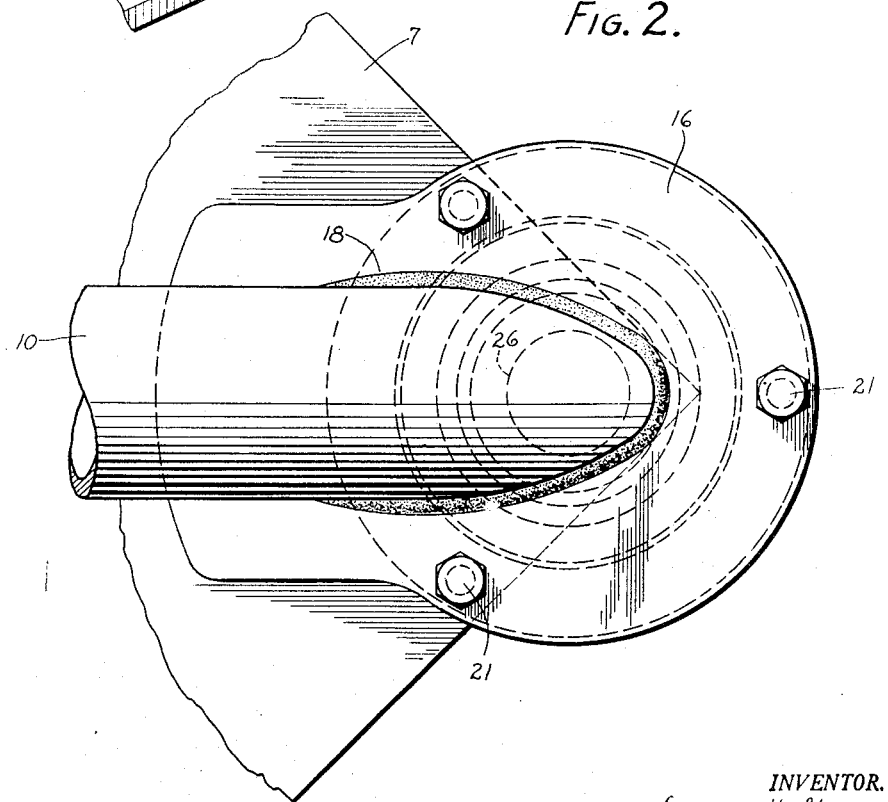
Figure 2 represents a front elevation of the structure shown in Figure 1.

The rake bars 10 are preferably of tubular metal construction and the ends of the bars adjacent spider 7 are connected thereto as clearly shown in Figs. 1 and 2. The end of each rake bar 10 is cut or disposed in a diagonal plane parallel to the adjacent face of the spider 7 and to the plane of rotation thereof. The spider 7 rotates about an axis which is displaced radially inwardly from and parallel to the axis R of the pivot or stub shaft 26, Figure 1. A flat mounting plate 16 is secured over and flush against the end of bar 10 as by welding 18.

The diagonal mounting plate 16 projects substantially beyond the end of the bar 10. A bearing B is mounted on the plate and positioned beyond the end of the bar 10 as far as is necessary in order that the intersection between the axes A and R of the bar 10 and bearing B, respectively, may be located at the center of an annular row of balls 23 of the bearing. The bearing B employs but a single row or series of balls 23 so that its axial dimension and consequently the extent of longitudinal displacement required to locate its axis at the proper intersection point aforementioned may both be maintained at a minimum.

This bearing B may be of the fixed alignment type as shown in which the inner and outer races 22 and 30 respectively are both provided with annular grooves to retain between them the single row of balls 23. In order to facilitate assembly of the bearing, its outer race 30 is split as at 30a in the plane of the greatest diameter of its ball groove, and the two halves are held together in a housing 19B having a marginal flange 19C located flush with its rear end and bolted flush against the plate 16 as shown at 21, so that the plate 16 closes and seals this end of the bearing. At its other end the housing 19B is provided with an inwardly directed flange 19D which overlies a shoulder 22A on the inner race 22 to thus provide a suitable seal.

The stud or stub shaft 26 is rigidly fixed on the spider 7. Fig. 1 exemplifies one of several possible ways of operatively mounting the inner race 22 on the spider 7, the inner race being disposed axially on the stud 26 and secured against axial and rotary movement by means such as a set screw 27 threaded through a collar 28 formed integrally on the inner race externally of the housing and adjacent the spider 7.

In the foregoing combination it will be apparent that there is provided an accurate, economical, and nevertheless, quite simple way of mounting the bearing with its rotational axis at the desired diagonal angle to the major axis of the roller bar 10. Moreover, it will be seen that this arrangement permits the major axis of the bar 10 to intersect the bearing axis at a point which will obviously be located in the center of the central radial plane of the bearing balls 23. Thus, the twisting forces transmitted to the bearing and tending to change its axis of rotation will be maintained near a minimum with consequently reduced wear on the bearing. It is of particular importance to note that, due to the specific location of the intersection of these axes A and R, any twisting force that might otherwise result from the weight of the roller bar 10 is eliminated while the twisting force resulting from ground engagement of the roller bar is maintained at a minimum.

In this divisional application we show and describe a preferred embodiment of our invention simply by way of illustration of the practice of the invention as by law required. However, we recognize that the invention is capable of other and different embodiments and that its several details may be modified in various ways all without departing from the inventive concept. Accordingly, the drawings and description herein are to be considered as merely illustrative in nature and not as exclusive.

Having thus described our invention, we claim:

1. In a side delivery rake, a spider supported for rotation about a fixed axis, an anti-friction bearing having an inner race fixedly supported on said spider and an outer race rotatable on said inner race about a axis parallel to said fixed axis, a rake bar disposed diagonally to said fixed axis and having one end fixedly connected to said outer race in a location such that the major axis of the bar and the rotational axis of said outer race intersect at substantially the center of the bearing.

2. In a side delivery hay rake, a spider supported for rotation about a fixed axis, a stud mounted on said spider at a point spaced from said fixed axis, said stud having an axis which extends parallel to said fixed axis, an anti-friction bearing having an inner race mounted on said stud, means fixedly connecting said stud and said inner race to said spider, said bearing having an outer race rotatable on said inner race about said parrallel axis, a rake bar disposed diagonally to said fixed and parallel axes and having one end fixedly connected to said outer race in a location such that the major axis of the bar and the parallel axis of said stud intersect at substantially the center of the bearing.

3. In a side delivery hay rake, a spider supported for rotation about a fixed axis, a stud mounted on said spider at a point spaced from said fixed axis, said stud having an axis which extends parallel to said fixed axis, an anti-friction bearing having an inner race mounted on said stud, means fixedly connecting said stud and said inner race to said spider, said bearing having an outer race rotatable on said inner race about said parallel axis, a rake bar disposed diagonally to said fixed and parallel axis and having one end fixedly connected to said outer race in a location such that the major axis of the bar and the parallel axis of said stud intersect at substantially the center of the bearing, and a single, annular roll of anti-friction elements interposed between said inner and outer races in a radial plane of said bearing center.

4. In a side delivery hay rake, a spider supported for rotation about a fixed axis, a stud fixedly mounted on said spider at a point spaced from said fixed axis, said stud having an axis which extends parallel to said fixed axis, an anti-friction bearing having an inner race mounted on said stud, threaded means for affixing said inner race to said stud, said bearing having an outer race rotatable on said inner race about said parallel axis, a single annular roll of anti-friction balls interposed between said inner and outer races, a tubular rake bar disposed diagonally to said fixed and parallel axes, and means fixedly connecting one end of said rake bar to said outer race in a location such that the major axis of said bar and the parallel axis of said stud intersect at substantially the center of the bearing, said annular roll of balls being disposed in a radial plane of said bearing center.

5. In a side delivery hay rake of the roller bar reel type, a spider supported for rotation about a fixed axis, a stud fixedly mounted on said spider at a point spaced from said fixed axis, said stud having an axis which extends parallel to said fixed axis, an anti-friction bearing having an inner race mounted on said stud, threaded means for affixing said inner race to said stud, said bearing having an outer race rotatable on said inner race about said parallel axis, a single annular roll of anti-friction balls interposed between said inner and outer races, a tubular rake bar disposed diagonally to said fixed and parallel axes and having an end disposed diagonally to the major axis of the bar, a flat plate secured flush against said end, means fixedly connecting said flat plate to said outer race in a position such that the plate extends in a plane parallel to said spider, and the major axis of said bar and the parallel axis of said stud intersect at substantially the center of the bearing, said annular roll of balls being disposed in a radial plane of said bearing center.

References Cited in the file of this patent

UNITED STATES PATENTS

| | | |
|---|---|---|
| 2,022,252 | Miltenberger | Nov. 26, 1935 |
| 2,105,120 | Johnson | Jan. 11, 1938 |
| 2,603,933 | Shore | July 22, 1952 |
| 2,621,465 | Klemm | Dec. 16, 1952 |